(No Model.) 2 Sheets—Sheet 1.
E. L. RAYNSFORD.
METALLIC PACKING.
No. 553,738. Patented Jan. 28, 1896.
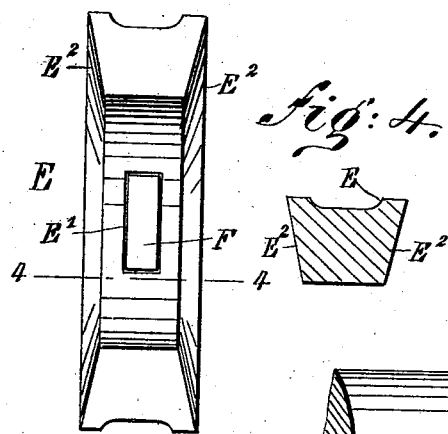
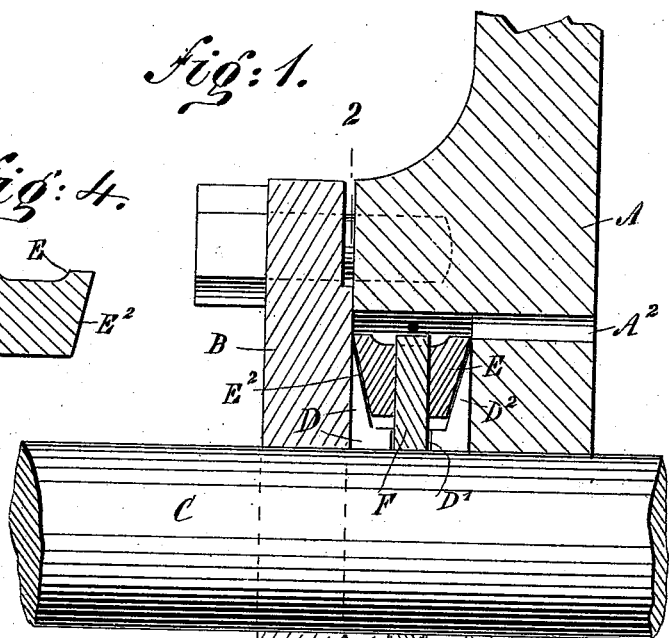
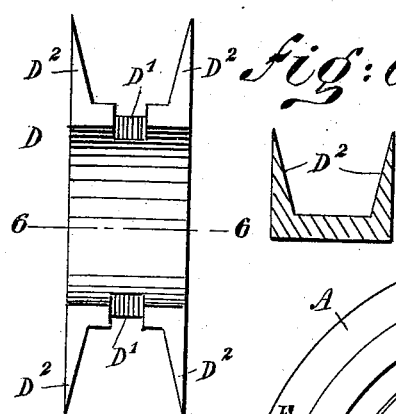
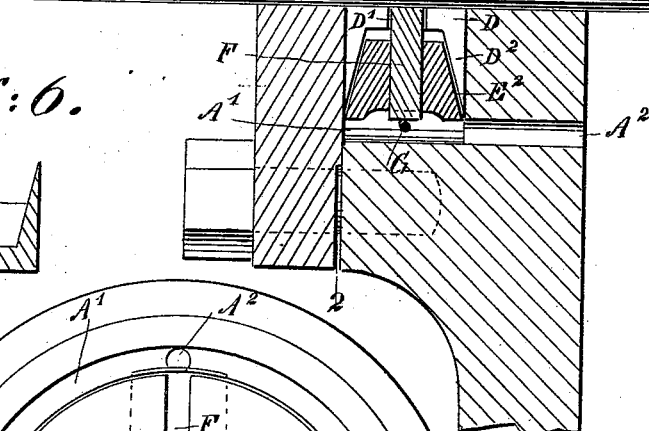
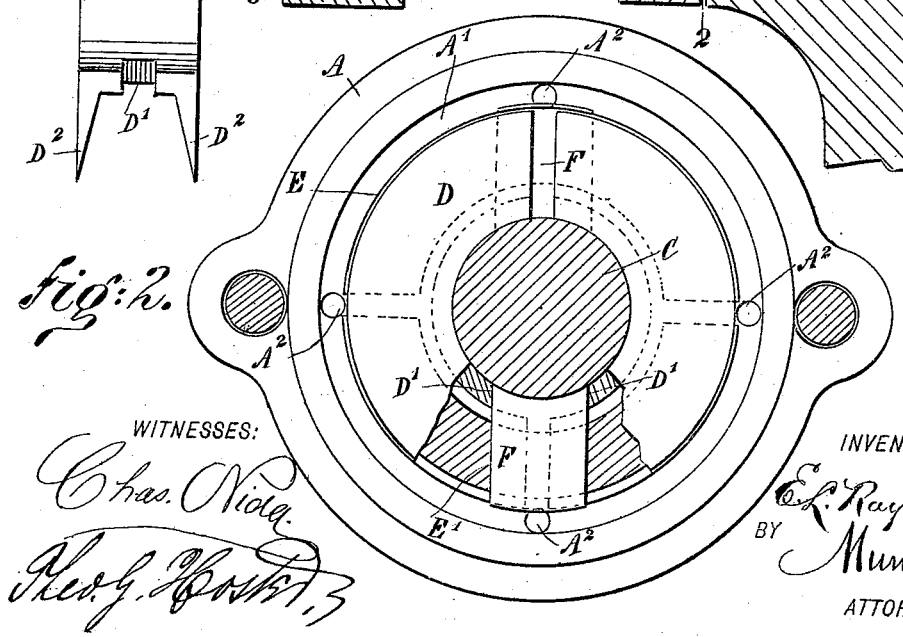
WITNESSES:
Chas. Niola
Fred G. Hosh?
INVENTOR
E. L. Raynsford
BY Munn & Co
ATTORNEYS.

(No Model.) 2 Sheets—Sheet 2.
E. L. RAYNSFORD.
METALLIC PACKING.
No. 553,738. Patented Jan. 28, 1896.
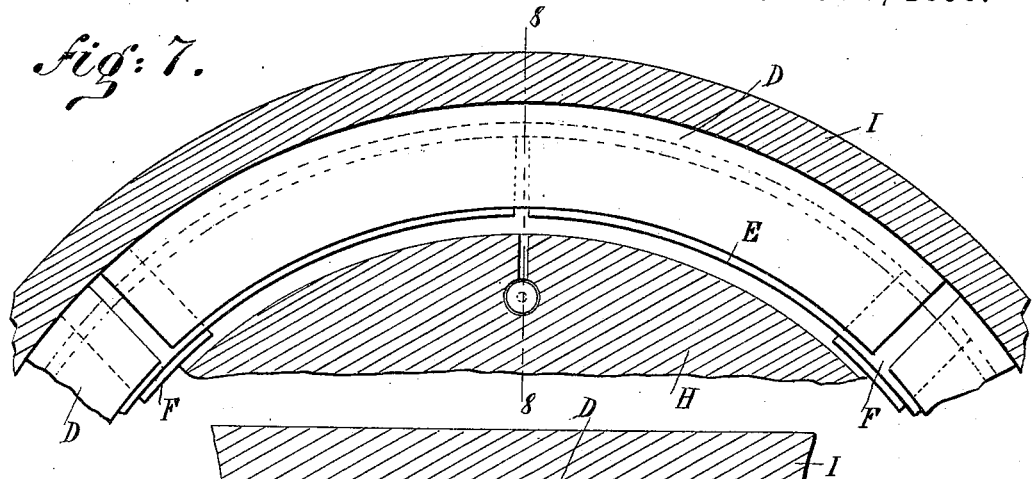
Fig: 7.
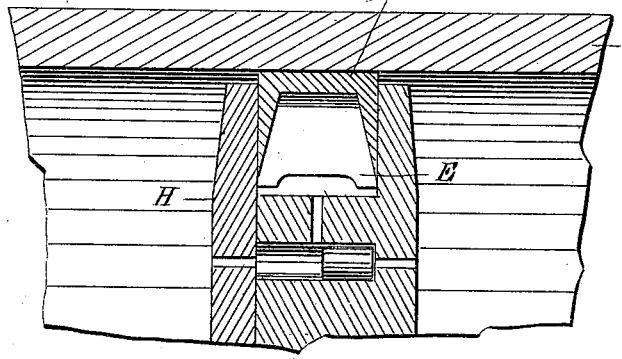
Fig: 8.
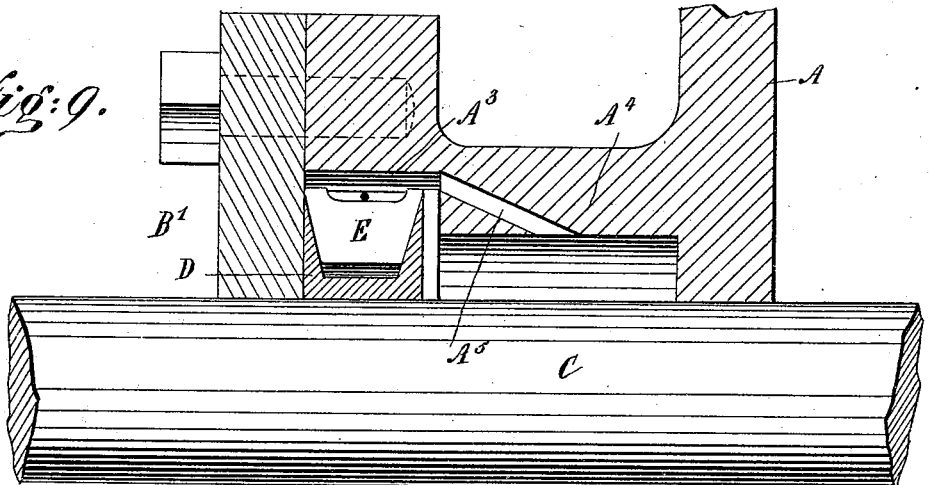
Fig: 9.
WITNESSES:
Chas. Nida.
INVENTOR
E. L. Raynsford
BY
Munn & Co.
ATTORNEYS.

UNITED STATES PATENT OFFICE.

EDWARD L. RAYNSFORD, OF SUSQUEHANNA, PENNSYLVANIA.

METALLIC PACKING.

SPECIFICATION forming part of Letters Patent No. 553,738, dated January 28, 1896.

Application filed June 29, 1895. Serial No. 554,472. (No model.)

*To all whom it may concern:*

Be it known that I, EDWARD LATHROP RAYNSFORD, of Susquehanna, in the county of Susquehanna and State of Pennsylvania, have invented a new and Improved Metallic Packing, of which the following is a full, clear, and exact description.

The invention relates to metallic packings such as shown and described in Letters Patent of the United States No. 542,106, granted to me on July 2, 1895.

The object of the invention is to provide a new and improved metallic packing, designed for use on piston-rods, pistons, balance slide-valves, and other devices, and arranged to form at all times a very secure packing without the use of springs, glands, &c.

The invention consists principally of a ring provided with an annular groove having outwardly-beveled sides and a second ring having inwardly-beveled sides and fitting in the groove of the said first-named ring.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a sectional side elevation of the improvement as applied on a cylinder-head and piston-rod. Fig. 2 is a cross-section of the same on the line 2 2 of Fig. 1 and with parts broken out. Fig. 3 is an inner face view of a section of one of the rings. Fig. 4 is a sectional plan view of the same on the line 4 4 of Fig. 3. Fig. 5 is an inner face view of a section of the other ring. Fig. 6 is a sectional plan view of the same on the line 6 6 of Fig. 5. Fig. 7 is a side elevation of the improvement as applied on a piston. Fig. 8 is a transverse section of the same on the line 8 8 of Fig. 7; and Fig. 9 is a sectional side elevation of the improvement as applied on a cylinder-head having a stuffing-box.

The metallic packing, as illustrated in Figs. 1 and 2, is applied on a cylinder-head A formed on its outer face with a chamber A', from which lead ports $A^2$ to the inside of the cylinder. The outer end of this chamber A' is closed by a plate B fastened by bolts or other means to the head A, and through which passes the piston-rod C to be packed. In the chamber A' is arranged the packing, composed of an inner ring, D, and an outer ring, E, fitted in an annular groove formed on the periphery of the inner ring, D, as is plainly shown in the drawings. The inner ring, D, is made in two or more sections, each formed at its ends with recesses D', of which the recess in one end of a section registers with recess of the other section, and in each pair of adjacent registering recesses is fitted to slide a block F, also passing through an aperture E' formed in the outer ring, E. The latter is likewise made in sections, two or more in number, and with the joints standing at right angles to the joints of the inner ring, D. (See Fig. 2.) Each section of the inner ring, D, is provided with beveled sides $D^2$, as illustrated in Figs. 5 and 6, to receive the beveled sides $E^2$ of the sections of the outer ring, E, the said sides $E^2$ being beveled inwardly, as plainly indicated in Figs. 3 and 4, to correspond with the outer bevels of the sides $D^2$. (See Figs. 5 and 6.)

A band or ring G, of wire or other suitable material, is passed around the peripheral surface of the outer ring, E, and over the outer ends of the blocks F, so as to hold the several parts together, the rings and blocks F being arranged to fit into the chamber A' in such a manner that sufficient space is left between the periphery of the outer ring, E, and the peripheral walls of the chamber A' for the entrance of steam under pressure passing from the interior of the cylinder through the ports $A^2$ to the annular space to press the sections of the outer ring, E, in firm contact with the sections of the inner ring, so that the latter is firmly pressed in contact with the piston-rod C, and consequently the latter is packed. The steam also presses on the blocks F, so as to hold the latter in contact with the piston-rod C at the joint of the sections of the inner ring, D, to prevent the escape of steam at this joint.

It is understood that the blocks F are fitted to slide in the outer ring-sections at or near the middle thereof, as is plainly illustrated in Fig. 2, whereby the joints of the sections of the inner and outer rings are brought to stand at right angles to each other, and the sections are at the same time held in position relatively to one another. It will further be seen that by providing the inner packing-ring, D, with beveled sides, pressed on by the beveled sides of the outer ring, E, a firm joint is established by the packing and the plate B, so that steam cannot leak out in the opening of the plate.

As shown in Fig. 1, the chamber $A'$ is formed in a boss in the cylinder-head A; but in case the cylinder-head is already provided with a stuffing-box, as shown in Fig. 9, then I form the chamber $A^3$ in the stuffing-box $A^4$ and place the packing in this chamber $A^3$ with the plate B as a cover. Ports $A^5$ lead from the stuffing-box $A^4$ to the said chamber $A^3$ to cause the steam to press the packing, as above described in reference to Figs. 1 and 2.

When the device is applied on pistons H, as illustrated in Figs. 7 and 8, the inner ring, D, becomes the outer ring, but with the beveled sides extending inwardly, so that the peripheral surface of this ring is moved in contact with the inner surface of the cylinder I and the outer ring, E, becomes the inner ring and fits into the beveled sides of the ring D in the manner above described. Now the steam passes from either end of the cylinder into the annular space in which the packing is placed, so as to press on the ring E to force the other ring D in contact with the inner surface of the cylinder. The steam from either end of the cylinder is governed by a valve or may be otherwise introduced to the annular space in which the packing is located. If the device is applied on balance slide-valves, the packing is made in straight form and with or without the blocks F.

Having thus fully described my invention, I claim as new and desire to secure by Letters Patent—

1. A metallic packing, comprising a ring provided with an annular groove having outwardly-beveled sides, a second ring having inwardly-beveled sides and fitting in the groove of the first-named ring, and blocks fitted to slide in one of the rings and pass through registering openings in the ends of the other ring-sections, substantially as shown and described.

2. A metallic packing, comprising a ring formed in sections, each section being provided with a groove in its periphery, the said groove having beveled sides and recesses in its ends, a second ring likewise formed in sections each section having its sides beveled to fit the grooves of the other ring-sections, and blocks fitted to slide in the second-named ring and pass through the said recesses in the first-named ring, substantially as shown and described.

3. A metallic packing, comprising an annular chamber in communication with a pressure-supply, two sectional packing-rings held in the said chamber, one fitting upon the other, and blocks fitted to slide in the said ring, to break the joint of the inner ring, substantially as shown and described.

EDWARD L. RAYNSFORD.

Witnesses:
WILLIAM M. ALLPAUGH,
ALBERT L. LANGFORD.